United States Patent
DeRoy et al.

(10) Patent No.: US 10,502,145 B2
(45) Date of Patent: Dec. 10, 2019

(54) INTEGRATED FUEL AND BLEED SYSTEM CONTROL ARCHITECTURE

(71) Applicant: Hamilton Sundstrand Corporation, Charlotte, NC (US)

(72) Inventors: Robert M. DeRoy, Tolland, CT (US); Adam Woods, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 11 days.

(21) Appl. No.: 15/645,268

(22) Filed: Jul. 10, 2017

(65) Prior Publication Data
US 2019/0010876 A1 Jan. 10, 2019

(51) Int. Cl.
| | |
|---|---|
| *F02C 9/00* | (2006.01) |
| *F02C 9/52* | (2006.01) |
| *F02C 6/08* | (2006.01) |
| *B64D 31/06* | (2006.01) |
| *F02C 7/18* | (2006.01) |
| *B64D 13/06* | (2006.01) |
| *B64D 15/04* | (2006.01) |
| *B64D 13/08* | (2006.01) |

(52) U.S. Cl.
CPC .......... *F02C 9/52* (2013.01); *F02C 6/08* (2013.01); *B64D 13/08* (2013.01); *B64D 15/04* (2013.01); *B64D 31/06* (2013.01); *B64D 2013/0618* (2013.01); *B64D 2013/0696* (2013.01); *F02C 7/18* (2013.01); *F05D 2220/323* (2013.01); *F05D 2220/50* (2013.01); *F05D 2260/20* (2013.01); *F05D 2270/11* (2013.01); *F05D 2270/114* (2013.01); *F05D 2270/44* (2013.01); *F05D 2270/54* (2013.01)

(58) Field of Classification Search
None
See application file for complete search history.

(56) References Cited

U.S. PATENT DOCUMENTS

| | | |
|---|---|---|
| 6,481,210 B1 | 11/2002 | Chapman |
| 7,970,497 B2 | 6/2011 | Derouineau et al. |
| 9,156,560 B2 | 10/2015 | Burns et al. |
| 2006/0254282 A1* | 11/2006 | Riley .................. F02C 7/26 60/773 |

(Continued)

OTHER PUBLICATIONS

Extended European Search Report for European Application No. 18182732.0 dated Dec. 13, 2018; 11 Pages.

*Primary Examiner* — Truc M Do
(74) *Attorney, Agent, or Firm* — Cantor Colburn LLP

(57) ABSTRACT

A fuel and bleed controller is provided. The fuel and bleed controller includes a processor and a memory. The memory stores program instructions thereon. The program instructions are executable by the processor to cause the fuel and bleed controller to send status requests to systems of the aircraft. The systems comprise a bleed system and bleed user controllers. The program instructions are further executable by the processor to cause the fuel and bleed controller to receive status responses from the systems of the aircraft and determine fuel requirements based on the status responses in advance of operational needs by the systems of the aircraft. The program instructions are further executable by the processor to cause the fuel and bleed controller to control engines of the aircraft based on the fuel requirements.

12 Claims, 3 Drawing Sheets

(56) References Cited

U.S. PATENT DOCUMENTS

| | | | |
|---|---|---|---|
| 2007/0259256 A1* | 11/2007 | Le Canut | H01M 8/04089 |
| | | | 429/90 |
| 2009/0097962 A1 | 4/2009 | Williams | |
| 2012/0095663 A1 | 4/2012 | Roy et al. | |
| 2012/0185116 A1* | 7/2012 | DeFrancesco | B64D 13/00 |
| | | | 701/3 |
| 2015/0107261 A1 | 4/2015 | Moes et al. | |
| 2015/0251765 A1* | 9/2015 | Jonqueres | B64D 13/08 |
| | | | 62/86 |
| 2015/0275768 A1* | 10/2015 | Anghel | F02C 9/18 |
| | | | 701/99 |
| 2015/0354464 A1* | 12/2015 | Hillel | F02C 3/04 |
| | | | 415/1 |
| 2017/0036773 A1 | 2/2017 | Jones et al. | |
| 2017/0058784 A1* | 3/2017 | Vandale | F02C 9/18 |
| 2017/0260932 A1* | 9/2017 | Brock | F02M 25/0872 |

* cited by examiner

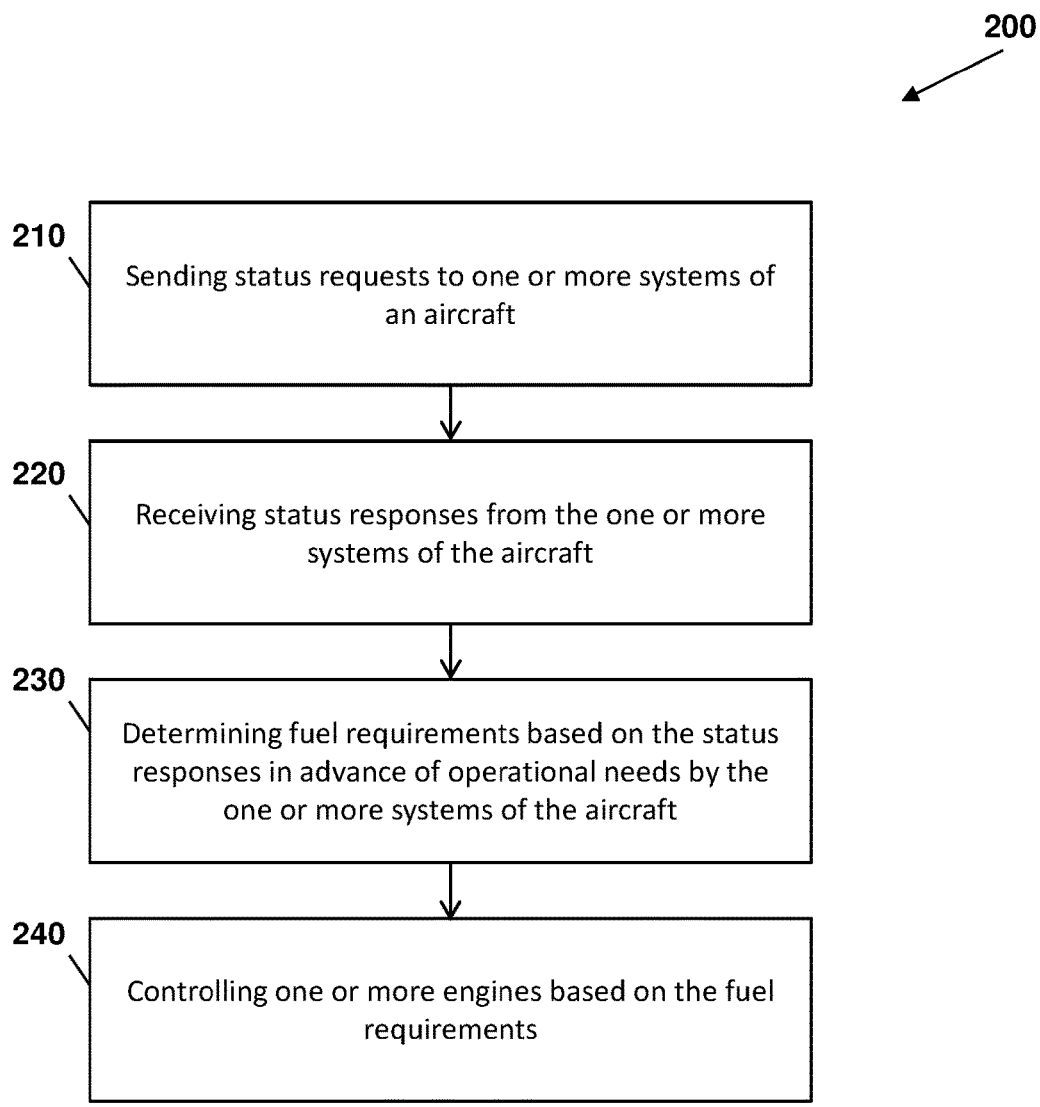

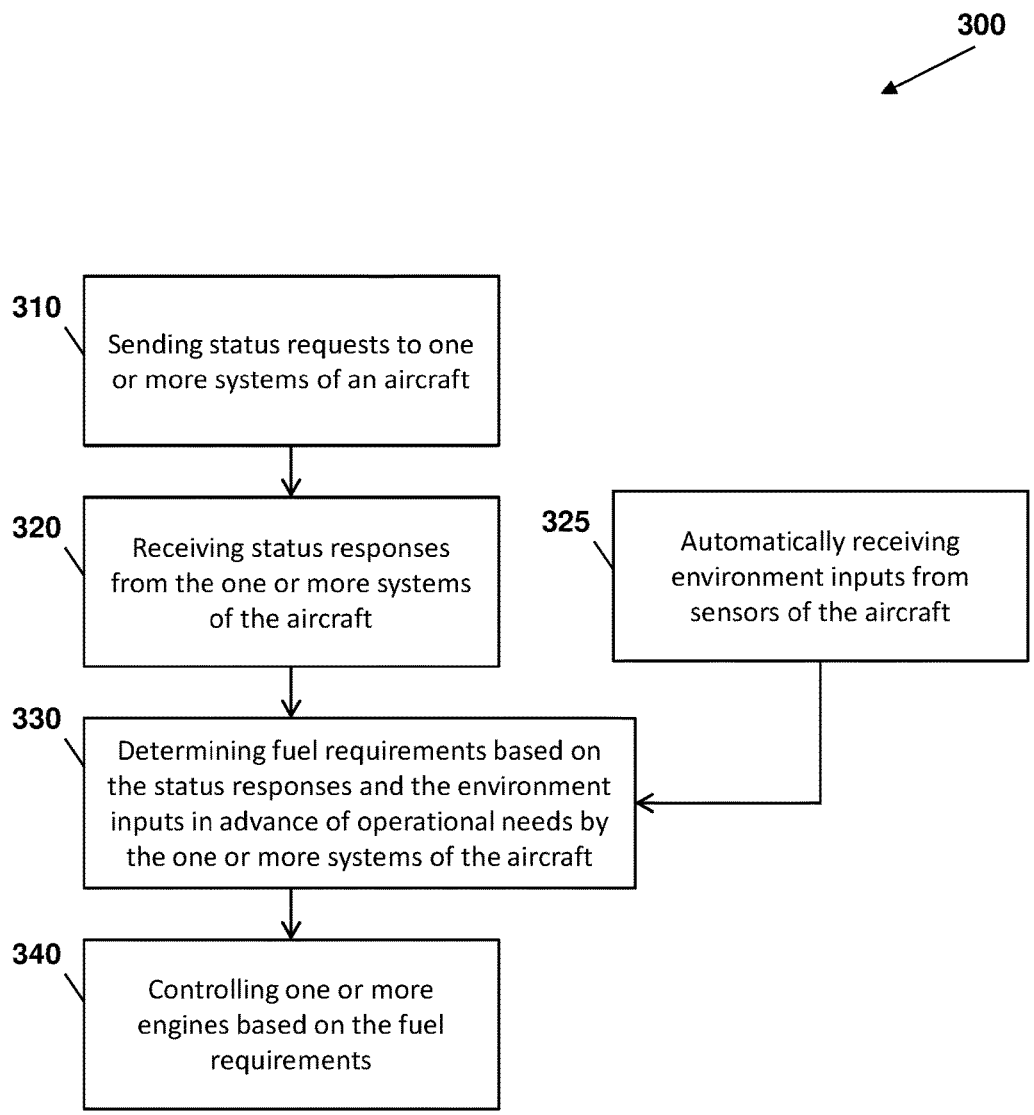

INTEGRATED FUEL AND BLEED SYSTEM CONTROL ARCHITECTURE

BACKGROUND

In general, with respect to aircrafts, contemporary fuel system control and contemporary bleed system control are performed in separate controllers that exchange limited information (e.g., contemporary fuel system controllers control engine operations and contemporary bleed system controllers control air management). Having a limited information exchange, along with present data latency issues, impacts the performance of engines and bleed systems operated by these contemporary fuel system controllers and contemporary bleed system controllers.

BRIEF DESCRIPTION

According to one or more embodiments, a fuel and bleed controller is provided. The fuel and bleed controller comprises a processor and a memory storing program instructions thereon, the program instructions executable by the processor to cause the fuel and bleed controller to: send status requests to one or more systems of the aircraft, wherein the one or more systems comprise a bleed system and one or more bleed user controllers; receive status responses from the one or more systems of the aircraft; determine fuel requirements based on the status responses in advance of operational needs by the one or more systems of the aircraft; and control one or more engines of the aircraft based on the fuel requirements.

According to one or more embodiments or the above fuel and bleed controller, the fuel and bleed controller can communicate directly across one or more digital connections with the bleed user controllers.

According to one or more embodiments or any of the above fuel and bleed controllers, the status responses can comprise operational information of the bleed system and the one or more bleed user controllers.

According to one or more embodiments or any of the above fuel and bleed controllers, the fuel requirements can comprise predictive estimations of an amount of fuel needed by future power requests by the bleed system or the one or more bleed user controllers.

According to one or more embodiments or any of the above fuel and bleed controllers, the predictive estimations of the amount of fuel can enable the fuel and bleed controller to control a consistent bleed pressure supply by the engine to avoid mechanical stress on the engine.

According to one or more embodiments or any of the above fuel and bleed controllers, the fuel and bleed controller can automatically receive environment inputs from sensors of the aircraft.

According to one or more embodiments or any of the above fuel and bleed controllers, the fuel requirements can be determined based on the status responses and the environment inputs.

According to one or more embodiments, a fuel and bleed method is provided. The fuel and bleed method comprises sending, by a fuel and bleed controller of an aircraft, status requests to one or more systems of the aircraft, wherein the one or more systems comprise a bleed system and one or more bleed user controllers; receiving, by the fuel and bleed controller, status responses from the one or more systems of the aircraft; determining, by the fuel and bleed controller, fuel requirements based on the status responses in advance of operational needs by the one or more systems of the aircraft; and controlling, by the fuel and bleed controller, one or more engines of the aircraft based on the fuel requirements.

According to one or more embodiments or the above fuel and bleed method, the fuel and bleed controller can communicate directly across one or more digital connections with the bleed user controllers.

According to one or more embodiments or any of the above fuel and bleed methods, the status responses can comprise operational information of the bleed system and the one or more bleed user controllers.

According to one or more embodiments or any of the above fuel and bleed methods, the fuel requirements can comprise predictive estimations of an amount of fuel needed by future power requests by the bleed system or the one or more bleed user controllers.

According to one or more embodiments or any of the above fuel and bleed methods, the predictive estimations of the amount of fuel can enable the fuel and bleed controller to control a consistent bleed pressure supply by the engine to avoid mechanical stress on the engine.

According to one or more embodiments or any of the above fuel and bleed methods, the fuel and bleed controller can automatically receive environment inputs from sensors of the aircraft.

According to one or more embodiments or any of the above fuel and bleed methods, the fuel requirements can be determined based on the status responses and the environment inputs.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

FIG. 2 depicts a process flow with respect to an integrated fuel and bleed system control architecture according to one or more embodiments; and FIG. 3 depicts a process flow with respect to an integrated fuel and bleed system control architecture according to one or more embodiments.

DETAILED DESCRIPTION

Figure 1:
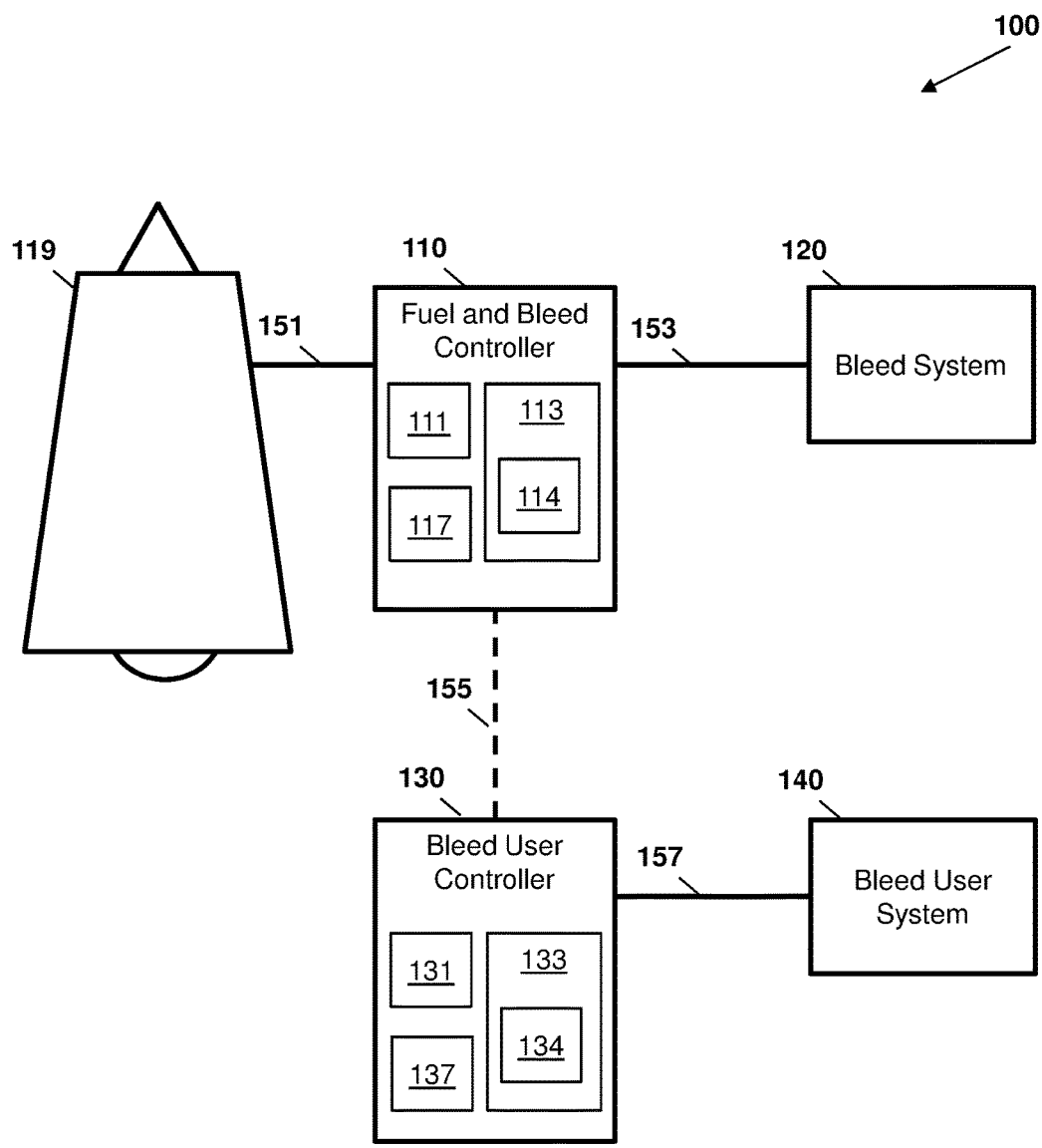
FIG. 1 depicts an integrated fuel and bleed system control architecture comprising a fuel and bleed controller according to one or more embodiments.

A detailed description of one or more embodiments of the disclosed apparatus and method are presented herein by way of exemplification and not limitation with reference to the FIGS.

Embodiments herein provide an integrated fuel and bleed system control architecture comprising a fuel and bleed controller. The fuel and bleed controller is an integrated mechanism that communicates with multiple systems of an aircraft, which provides opportunities for improved engine performance and life, more efficient bleed system operations, and more efficient aircraft operations (as a whole) compared to separate contemporary fuel system and contemporary bleed system control controllers. For instance, the fuel and bleed controller removes any data latency of the separate contemporary fuel system and contemporary bleed system control controllers with respect to these contemporary controllers reacting to the needs of the systems they control (e.g., any timing issues associated with the communications between these contemporary controllers is removed by the integrated mechanism of the fuel and bleed controller).

Turning now to FIG. 1, an integrated fuel and bleed system control architecture 100 comprising a fuel and bleed controller 100 is depicted according to one or more embodiments. The fuel and bleed controller 110 is configured to send status requests for operational information to other systems and components of the aircraft, receive status responses, determine fuel requirements based on the status responses and/or system sensor responses, and perform control operations with respect to the fuel determinations.

The fuel and bleed controller 110 can comprise a processor 111, a memory 113, software 114, and a transceiver 117. The processor 111 (also referred to as a processing circuit) can be coupled via a system bus to the memory 113, and various other components. The memory 113 can include a read only memory (ROM) and a random access memory (RAM). The ROM is coupled to the system bus and may include a basic input/output system (BIOS), which controls certain basic functions of the integrated fuel and bleed system control architecture 100. The RAM is read-write memory coupled to the system bus for use by the processor 111.

Software 114 for execution by the integrated fuel and bleed system control architecture 100 may be stored in the memory 113. The memory 113 is an example of a tangible storage medium readable by the processor 111, where the software 114 is stored as instructions for execution by the processor 111 to cause the integrated fuel and bleed system control architecture 100 to operate, such as is described herein with reference to FIGS. 2 and 3. Examples of computer program product and the execution of such instruction is discussed herein in more detail.

The transceiver 117 can be input/output (I/O) and/or communication adapters coupled to the system bus. For example, the I/O adapter may be a small computer system interface (SCSI) adapter. The transceiver 117 can communicate signals through wired or wireless connections, as described herein.

The integrated fuel and bleed system control architecture 100 comprises an engine 119, a bleed system 120, a bleed user controller 130, and a bleed user system 140.

The engine 119 can be any machine designed to convert one form of energy (e.g., jet fuel) into mechanical energy (e.g., hydraulic power, pneumatic power, and electric power to other systems of an aircraft). In accordance with one or more embodiments, because the integrated fuel and bleed system control architecture 100 understands needs of the aircraft from a pneumatic standpoint (e.g., based on the operations of the fuel and bleed controller), the engine 119 can receive proper instructions in advance of those needs to increase engine efficiency and performance.

The bleed system 120 can be a pneumatic system that extracts or bleeds air from the engine 119 (e.g., bleed air is compressed air taken from a compressor of the engine 119) and provides that bleed air as pneumatic power for internal cooling of the engine 119 and/or the aircraft, cross-starting another engine, engine and airframe anti-icing, cabin, etc. The bleed system 120 comprises heat exchangers, manifold ducts, sensors, valves, etc. that can acquire and provide operational information of the bleed system 120. In general, the sensors can be an electro-mechanical component that detects events or changes in an environment (the engine 119 and/or the aircraft) and outputs the events or changes as sensor signals to other components of the integrated fuel and bleed system control architecture 100 (e.g., outputs operational information as status responses; as described here with respect to connection 153).

The bleed user controller 130 can comprise a processor 131, a memory 133, software 134, and a transceiver 137. The processor 131 (also referred to as a processing circuit) can be coupled via a system bus to the memory 133, and various other components. The memory 133 can include a read only memory (ROM) and a random access memory (RAM). The ROM is coupled to the system bus and may include a basic input/output system (BIOS), which controls certain basic functions of the integrated fuel and bleed system control architecture 100. The RAM is read-write memory coupled to the system bus for use by the processor 131.

Software 134 for execution by the integrated fuel and bleed system control architecture 100 may be stored in the memory 133. The memory 133 is an example of a tangible storage medium readable by the processor 131, where the software 134 is stored as instructions for execution by the processor 131 to cause the integrated fuel and bleed system control architecture 100 to operate, such as is described herein with reference to FIGS. 2 and 3. Examples of computer program product and the execution of such instruction is discussed herein in more detail.

The transceiver 137 can be input/output (I/O) and/or communication adapters coupled to the system bus. For example, the I/O adapter may be a small computer system interface (SCSI) adapter. The transceiver 137 can communicate signals through wired or wireless connections, as described herein.

The bleed user controller 130 can control the operations of the bleed user system 140. The bleed user system 140 can comprise one or more bleed users (e.g., components that utilize the pneumatic power supplied by the bleed system 120), sensors, and valves. Examples of bleed users include environmental control systems (ECS), wing anti-ice (WAI) systems, inert gas systems, water supply, etc.

In view of the above, connections 151, 153, 155, and 157 can support communications throughout the integrated fuel and bleed system control architecture 100. For instance, the connection 151 can support communications between the engine 119 and the fuel and bleed controller 110; the connection 153 can support communications between the bleed system 120 and the fuel and bleed controller 110; the connection 155 can support communications between the bleed user controller 130 and the fuel and bleed controller 110; and the connection 157 can support communications between the bleed user system 140, the fuel and bleed controller 110, and/or the bleed user controller 130.

According to one or more embodiments, the connections 151, 153, and 157 can comprise hardware interface, which can be bi-directional, and the connection 155 can comprise digital interface, which can also be bi-directional. Note that the connections 151, 153, 155, and 157 can be further supported by one or more networks that can include IP Networks, Wi-Fi networks, etc. Thus, the fuel and bleed controller 110 can send status requests to the bleed system 120, the bleed user controller 130, and the bleed user system 140 via the bleed user controller 130. Further, the bleed system 120, the bleed user controller 130, and the bleed user system 140 via the bleed user controller 130 can send status responses to the fuel and bleed controller 110.

Note that each item of FIG. 1 can be representative of one or more of that item such that, for example, the fuel and bleed controller 110 can comprise one or more processors 111, one or more memories 112, etc.

FIG. 2 depicts a process flow 200 with respect to an integrated fuel and bleed system control architecture 100 according to one or more embodiments. The process flow 200 begins at block 210, where the fuel and bleed controller 110 sends status requests to one or more of the systems of an aircraft (e.g., the bleed system 120, the bleed user controller 130, and the bleed user system 140—the bleed user controller 130 passes 140 information to the fuel and bleed controller 110 and vice versa). The status requests can include communications for information by the fuel and bleed controller 110 to one or more of the bleed system 120, the bleed user controller 130, and the bleed user system 140 over the connections 153, 155, and 157. Note that the connection 155, in accordance with one or more embodiments, represents digital connections that enable the bleed user controllers 130 to communicate directly with the fuel and bleed controller 110.

At block 220, the fuel and bleed controller 110 receives status responses from the one or more of systems of the aircraft. The status responses can comprise operational information of the bleed system 120, the bleed user controller 130, and/or the bleed user system 140.

At block 230, the fuel and bleed controller 110 determines fuel requirements based on the status responses in advance of operational needs by the systems of the aircraft. The fuel requirements are predictive estimations of the amount of fuel (whether more or less) needed for future power requests by the bleed system 120, the bleed user controller 130, and/or the bleed user system 140. That is, the predictive estimations of the amount of fuel enable the fuel and bleed controller 110 to control a consistent bleed pressure supply by the engine 119 to the bleed system 120, the bleed user controller 130, and/or the bleed user system 140 that avoids mechanical stress on the engine while improving fuel efficiency. In this way, the fuel and bleed controller 110 to can determine how to throttle the engine 119, how much fuel to supply and what amount, etc. before these operations are needed.

For instance, as the engine 119 provides bleed pressure for the bleed users of the bleed user system 140, the fuel and bleed controller 110 can determine how to maintain a more consistent bleed pressure by determining a subsequent fuel demand required by the operational information within the status responses (e.g., to avoid mechanical stress on the engine 119 when other systems are trying to steal pneumatic power).

At block 240, the fuel and bleed controller 110 controlling one or more engines (e.g., the engine 119) based on the fuel requirements.

FIG. 3 depicts a process flow 300 with respect to an integrated fuel and bleed system control architecture 100 according to one or more embodiments. The process flow 200 begins at block 310, where the fuel and bleed controller 110 sends status requests to one or more of the systems of an aircraft (e.g., the bleed system 120, the bleed user controller 130, and the bleed user system 140). The status requests can include communications for information by the fuel and bleed controller 110 to one or more of the bleed system 120, the bleed user controller 130, and the bleed user system 140 over the connections 153, 155, and 157. Note that the connection 155, in accordance with one or more embodiments, represents digital connections that enable the bleed user controllers 130 to communicate directly with the fuel and bleed controller 110.

At block 320, the fuel and bleed controller 110 receives status responses from the one or more of systems of the aircraft. The status responses can comprise operational information of the bleed system 120, the bleed user controller 130, and/or the bleed user system 140.

At block 325, the fuel and bleed controller 110 automatically receives environment inputs from sensors of the aircraft. That is, additional sensors can be embodied throughout the aircraft and provide aircraft operational information, such as altitude, speed, temperature, etc.

At block 330, the fuel and bleed controller 110 determines fuel requirements based on the status responses and the environment inputs in advance of operational needs by the systems of the aircraft.

At block 340, the fuel and bleed controller 110 controlling one or more engines (e.g., the engine 119) based on the fuel requirements.

Technical effects and benefits of embodiments herein can include enabling the fuel and bleed systems of the integrated fuel and bleed system control architecture to mutually understand the flows utilized by the bleed users via the fuel and bleed controller. By understanding the flows, embodiments herein can be used to anticipate bleed usage, improve engine control (e.g., cause the input of additional fuel in anticipated of the bleed usage), and provide efficient operations with respect to bleed switching (e.g., adjust blead air flow to accommodate needs of bleed users and maintain a consistent source of bleed air for the bleed users), thereby providing more efficient and more seamless aircraft performance than separate contemporary fuel system controllers and contemporary bleed system controllers.

Embodiments herein can include a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the embodiments herein.

Aspects of the embodiments herein are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. A configuration for an aircraft comprising:
    a fuel and bleed controller, the fuel and bleed controller comprising, a processor and a memory storing program instructions thereon,
    a plurality of aircraft systems including:
    a gas turbine engine controller;
    a bleed system that uses bleed air to provide pneumatic power for internal cooling of the aircraft and to provide pneumatic power for one or more of: inert gas system (IGS), internal cooling of the engine, cross starting another engine on the aircraft, anti-icing for the engine, and anti-icing for the airframe; and
    a plurality of bleed user controllers controlling operation of an environmental control system (ECS) and one or more of wing anti-ice (WAI) systems, the IGS and water supply systems;
    the fuel and bleed controller is configured for bi-directional electronic communication with each of the plurality of aircraft systems;
    the program instructions executable by the processor to cause the libel and bleed controller to:
    send status updates requests to the plurality of aircraft systems;

receive status responses from to the plurality of aircraft systems;

determine fuel requirements based on the status responses in advance of operational needs by the plurality of aircraft systems;

the fuel requirements including predictive estimations of an amount of fuel needed by future power requests by the bleed system or the a plurality of bleed user controllers; and control the engines of the aircraft based on the fuel requirements.

2. The configuration of claim 1, wherein the status responses comprise operational information of the bleed system and the plurality of bleed user controllers.

3. The configuration of claim 1, wherein the predictive estimations of the amount of fuel enable the fuel and bleed controller to control a consistent bleed pressure supply by the engine to avoid mechanical stress on the engine.

4. The configuration of claim 1, wherein the fuel and bleed controller automatically receives environment inputs from the sensors of the aircraft.

5. The configuration of claim 4, wherein the fuel requirements are determined based on the status responses and the environment inputs.

6. A fuel and bleed control method comprising:

engaging in bi-directional electronic communications between a fuel and bleed controller of an aircraft and a plurality of aircraft systems, the bi-directional communications including the fuel and bleed controller requesting status updates, the plurality of on aircraft systems comprising:

a gas turbine engine controller;

a bleed system that uses bleed air to provide pneumatic power for internal cooling of the aircraft and to provide pneumatic power for one or more of: inert gas system (IGS), internal cooling of the engine, cross starting another engine on the aircraft, anti-icing for the engine, and anti-icing for the airframe; and a plurality of bleed user controllers controlling operation of an environmental control system (ECS) and controlling operation of one or more of wing anti-ice (WAI) systems, the IGS and water supply systems;

receiving, by the fuel and bleed controller, status responses from the plurality of aircraft systems;

determining, by the fuel and bleed controller, fuel requirements based on the status responses in advance of operational needs by plurality of aircraft systems;

the fuel requirements including predictive estimations of an amount of fuel needed by future power requests by the bleed system or the plurality of bleed user controllers; and controlling, by the fuel and bleed controller, one or more engines of the aircraft based on the fuel requirements.

7. The fuel and bleed control method of claim 6, wherein the status responses comprise operational information of the bleed system and the plurality of bleed user controllers.

8. The fuel and bleed control method of claim 6, wherein the predictive estimations of the amount of fuel enable the fuel and bleed controller to control a consistent bleed pressure supply by the engine to avoid mechanical stress on the engine.

9. The fuel and bleed control method of claim 6, wherein the fuel and bleed controller automatically receives environment inputs from the sensors of the aircraft.

10. The fuel and bleed control method of claim 9, wherein the fuel requirements are determined based on the status responses and the environment inputs.

11. The configuration of claim 1, wherein:

the bleed system includes one or more of heat exchangers, manifold ducts, sensors, and valves, wherein the sensors are configured for communicating environmental inputs from the engine and/or aircraft.

12. The method of claim 6, wherein:

the bleed system includes one or more of heat exchangers, manifold ducts, sensors, and valves, wherein the sensors are configured for communicating environmental inputs from the engine and/or aircraft.

* * * * *